United States Patent
Xing et al.

(10) Patent No.: US 10,574,429 B2
(45) Date of Patent: Feb. 25, 2020

(54) DATA TRANSMISSION METHOD AND DEVICE FOR TIME DIVISION DUPLEX SYSTEM

(71) Applicant: CHINA ACADEMY OF TELECOMMUNICATIONS TECHNOLOGY, Beijing (CN)

(72) Inventors: Yanping Xing, Beijing (CN); Zukang Shen, Beijing (CN); Yanan Lin, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 6 days.

(21) Appl. No.: 15/539,646

(22) PCT Filed: Jan. 11, 2016

(86) PCT No.: PCT/CN2016/070603
§ 371 (c)(1),
(2) Date: Jun. 23, 2017

(87) PCT Pub. No.: WO2016/131352
PCT Pub. Date: Aug. 25, 2016

(65) Prior Publication Data
US 2018/0262319 A1    Sep. 13, 2018

(30) Foreign Application Priority Data
Feb. 16, 2015   (CN) .......................... 2015 1 0084635

(51) Int. Cl.
*H04L 5/14*      (2006.01)
*H04L 27/00*     (2006.01)
(Continued)

(52) U.S. Cl.
CPC .......... *H04L 5/1469* (2013.01); *H04L 5/0012* (2013.01); *H04L 5/0048* (2013.01);
(Continued)

(58) Field of Classification Search
CPC ................. H04L 5/1469; H04L 5/0048; H04L 2027/0026; H04W 72/0446; Y02D 70/21;
(Continued)

(56) References Cited

U.S. PATENT DOCUMENTS

| 6,434,183 B1 | 8/2002 | Kockmann et al. |
| 2009/0175214 A1 | 7/2009 | Sfar et al. |

(Continued)

FOREIGN PATENT DOCUMENTS

| CN | 101102148 A | 1/2008 |
| CN | 101183896 A | 5/2008 |

(Continued)

OTHER PUBLICATIONS

3GPP TSG RAN WG1 Meeting #80, Athens, Greece, Feb. 9-13, 2015, "Performance of Uplink frequency hopping for LTE Rel-13 MTC", R1-150288 (Year: 2015).*

(Continued)

*Primary Examiner* — Yemane Mesfin
*Assistant Examiner* — Intekhaab A Siddiquee
(74) *Attorney, Agent, or Firm* — Ladas & Parry, LLP

(57) ABSTRACT

A data transmission method and a data transmission device for a TDD system are provided, so as to reduce the frequency hopping operations, reduce the retuning time, prolong a valid duration for the data transmission and reduce the time period for the data transmission, and reduce the power consumption. The data transmission method includes steps of: at a predetermined retuning start time point, adjusting, by a UE, a carrier frequency for data reception and transmission within a predetermined retuning duration so as to acquire the (Continued)

adjusted carrier frequency; and performing, by the UE, uplink data transmission and downlink data reception at the adjusted carrier frequency with a network device within a consecutive duration in accordance with a TDD uplink-downlink configuration. The consecutive duration is a duration from a current retuning end time point to a next retuning start time point.

14 Claims, 5 Drawing Sheets

(51) Int. Cl.
    *H04L 5/00*     (2006.01)
    *H04W 72/04*     (2009.01)
    *H04W 4/70*     (2018.01)

(52) U.S. Cl.
    CPC ..... *H04L 27/0014* (2013.01); *H04W 72/0446* (2013.01); *H04L 2027/0026* (2013.01); *H04W 4/70* (2018.02); *Y02D 70/10* (2018.01); *Y02D 70/12* (2018.01); *Y02D 70/126* (2018.01); *Y02D 70/1262* (2018.01); *Y02D 70/21* (2018.01)

(58) Field of Classification Search
    CPC .. Y02D 70/12; Y02D 70/1262; Y02D 70/126; Y02D 70/10
    USPC .......................................................... 370/280
    See application file for complete search history.

(56) References Cited

U.S. PATENT DOCUMENTS

| | | | |
|---|---|---|---|
| 2010/0029282 A1 | 2/2010 | Stamoulis et al. | |
| 2014/0274094 A1 | 9/2014 | Abdelmonem et al. | |
| 2015/0085840 A1* | 3/2015 | Liu ................... | H04W 72/0446 370/336 |
| 2016/0028533 A1* | 1/2016 | Kazmi .............. | H04W 72/1278 370/296 |

FOREIGN PATENT DOCUMENTS

| | | |
|---|---|---|
| CN | 101965741 A | 2/2011 |
| CN | 102231871 A | 11/2011 |
| EP | 1261227 A1 | 11/2002 |
| JP | H10-022876 A | 1/1998 |
| JP | H10-022877 A | 1/1998 |
| WO | 9909678 A1 | 2/1999 |
| WO | 2015115998 A1 | 8/2015 |

OTHER PUBLICATIONS

3GPP TSG RAN WG1 Meeting #80, Athens, Greece, Feb. 9-13, 2015, "Frequency hopping schemes for LTE Rel-13 MTC", R1-150286 (Year: 2015).*
"Frequency hopping schemes for LTE Rel-13 MTC", R1-150286, 3GPP TSG RAN WG1 Meeting #80 (Year: 2015).*
3GPP TSG RAN WG1 Meeting #80, "Frequency hopping schemes for LTE Rel-13 MTC" R1-150286 (Year: 2015).*
3GPP TSG RAN WG1 Meeting #80, "Performance of Uplink frequency hopping for LTE Rel-13 MTC", R1-150288 (Year: 2015).*
International Preliminary Report on Patentability (IPRP; Ch. 1) for PCT/CN2016/070603, dated Aug. 31, 2017, and its English translation provided by WIPO.
Written Opinion of the International Search Authority for PCT/CN2016/070603, dated Apr. 19, 2016,and its English translation provided by WIPO.
From EPO Application No. 16751883.6, Extended European Search Report and Search Opinion dated Feb. 8, 2018.
R1-150144—ZTE: "Discussion on physical uplink control channel for MTC enhancement"; 3GPP TSG RAN WG1 Meeting # 80; Athens, Greece; Feb. 9-13, 2015; pp. 1-4.
R1-150286—NEC: "Frequency hopping schemes for LTE Rel-13 MTC"; 3GPP TSG RAN WG1 Meeting #80; Athens, Greece; Feb. 9-13, 2015; pp. 1-4.
R1-150288—NEC: "Performance of Uplink frequency hopping for LTE Rel-13 MTC"; 3GPP TSG RAN WG1 Meeting #80; Athens, Greece; Feb. 9-13, 2015; pp. 1-4.
Office Action from EP app. No. 16751883.6, dated Feb. 28, 2019.
From Chinese Application No. 201510084635.9, Office Action dated Aug. 2, 2018 with machine English translation from Global Dossier.
From Japanese Application No. 2017-543367, Office Action dated Aug. 21, 2018 with machine English translation from Global Dossier.
R1-152556—From CATT, "Narrowband design for Rel-13 low complexity UEs"; 3GPP TSG RAN WG1 Meeting #81; Fukuoka, Japan, May 25-29, 2015; pp. 1-3.
International Search Report for PCT/CN2016/070603, dated Apr. 19, 2016, and its English translation provided by WIPO.
Written Opinion of the International Search Authority for PCT/CN2016/070603, dated Apr. 19, 2016,and its English translation provided by Bing.Com Microsoft Translate.

\* cited by examiner

DATA TRANSMISSION METHOD AND DEVICE FOR TIME DIVISION DUPLEX SYSTEM

CROSS-REFERENCE TO RELATED APPLICATION

The present application is the U.S. national phase of PCT Application No. PCT/CN2016/070603 filed on Jan. 11, 2016, which claims a priority of the Chinese patent application No. 201510084635.9 filed on Feb. 16, 2015 and entitled "data transmission method and device for Time Division Duplex system", the disclosures of which are incorporated herein by reference in their entireties.

TECHNICAL FIELD

The present disclosure relates to the field of communication technology, in particular to a data transmission method and a data transmission device for a Time Division Duplex (TDD) system.

BACKGROUND

For a Time Division Long Term Evolution (TD-LTE) system, as a Time Division Duplex (TDD) system, its uplink data and downlink data have an identical carrier frequency but are transmitted separately in timing. FIG. 1 shows a radio frame structure for the TD-LTE system, where each radio frame consists of 10 subframes, including normal subframes 0, 2-5, 7-9 and two special subframes. Each special subframe consists of a Downlink Pilot Timeslot (DwPTS), a Guard Period (GP) and a Uplink Pilot Timeslot (UpPTS).

The GP is provided at a moment when a downlink subframe is switched to an uplink subframe, and it mainly functions as to prevent a downlink signal from interfering with an uplink signal. To be specific, as shown in FIG. 2, User Equipments (UEs) spaced apart from a base station at different distances may have different transmission time delays. In the case that a first UE is located close to the base station and a transmission time delay for the downlink data is Tp1, it means that the downlink data received by the first UE may be delayed by Tp1. In addition, in order to ensure the base station to receive the uplink data from different UEs in synchronization, i.e., to receive the uplink data at time points defined by the base station, the first UE also needs to transmit the uplink data at a time advance of Tp1. The transmission time delay may increase along with the distance between the UE and the base station being longer. For example, for a second UE which is located far away from the base station, its transmission time delay Tp2 is equal to GP/2 in a critical state, i.e., from the view of the second UE, the GP is a sum of the transmission time delay of the downlink data and the time advance of the uplink data, and the distance between the second UE and the base station is just a maximum cell coverage radius capable of being supported by the base station with the GP configuration.

Table 1 shows various configurations for each TD-LTE special subframe (in timeslot (Ts)).

TABLE 1

| Configuration | Normal Cyclic Prefix (CP) | | | Extended CP | | |
|---|---|---|---|---|---|---|
| | DwPTS | GP | UpPTS | DwPTS | GP | UpPTS |
| 0 | $6592 \cdot T_s$ | $21936 \cdot T_s$ | $2192 \cdot T_s$ | $7680 \cdot T_s$ | $20480 \cdot T_s$ | $2560 \cdot T_s$ |
| 1 | $19760 \cdot T_s$ | $8768 \cdot T_s$ | | $20480 \cdot T_s$ | $7680 \cdot T_s$ | |
| 2 | $21952 \cdot T_s$ | $6576 \cdot T_s$ | | $23040 \cdot T_s$ | $5120 \cdot T_s$ | |
| 3 | $24144 \cdot T_s$ | $4384 \cdot T_s$ | | $25600 \cdot T_s$ | $2560 \cdot T_s$ | |
| 4 | $26336 \cdot T_s$ | $2192 \cdot T_s$ | | $7680 \cdot T_s$ | $17920 \cdot T_s$ | $5120 \cdot T_s$ |
| 5 | $6592 \cdot T_s$ | $19744 \cdot T_s$ | $4384 \cdot T_s$ | $20480 \cdot T_s$ | $5120 \cdot T_s$ | |
| 6 | $19760 \cdot T_s$ | $6576 \cdot T_s$ | | $23040 \cdot T_s$ | $2560 \cdot T_s$ | |
| 7 | $21952 \cdot T_s$ | $4384 \cdot T_s$ | | — | — | — |
| 8 | $24144 \cdot T_s$ | $2192 \cdot T_s$ | | — | — | — |

Table 2 shows various configurations for each TD-LTE special subframe (in symbols).

TABLE 2

| Special subframe configuration | Normal CP | | | Extended CP | | |
|---|---|---|---|---|---|---|
| | DwPTS | GP | UpPTS | DwPTS | GP | UpPTS |
| 0 | 3 | 10 | 1 | 3 | 8 | 1 |
| 1 | 9 | 4 | | 8 | 3 | |
| 2 | 10 | 3 | | 9 | 2 | |
| 3 | 11 | 2 | | 10 | 1 | |
| 4 | 12 | 1 | | 3 | 7 | 2 |
| 5 | 3 | 9 | 2 | 8 | 2 | |
| 6 | 9 | 3 | | 9 | 1 | |
| 7 | 10 | 2 | | — | — | — |
| 8 | 11 | 1 | | — | — | — |

Table 3 shows various uplink-downlink configurations for the TD-LTE system, where D represents a downlink subframe, S represents a special subframe and U represents an uplink subframe.

TABLE 3

| Uplink-downlink configuration | uplink-downlink conversion period | Subframe No. | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 4 shows 6 types of system bandwidths for a Long Term Evolution (LTE) system.

TABLE 4

| | System Bandwidth (MHz) | | | | | |
| --- | --- | --- | --- | --- | --- | --- |
| | 1.4 | 3 | 5 | 10 | 15 | 20 |
| Transmission Bandwidth Configuration (the number of Resource Blocks (RBs)) | 6 | 15 | 25 | 50 | 75 | 100 |

For Release 12 or before, the UE is required to support a system bandwidth of 20 Mega Hertz (MHz), so as to operate at different system bandwidths. For Release 13, an LTE-based enhanced Machine Type Communications (MTC) UE is currently being studied, and a UE capable of merely supporting a bandwidth of 1.4 MHz has been proposed so as to reduce the complexity and cost of the UE. It follows that, in the case of a system bandwidth greater than 1.4 MHz, the UE may merely operate at a part of the system bandwidth.

In addition, such UE may be applied to a deep fading scenario such as a basement, so its coverage may be limited seriously. In order to communicate with the base station, the UE needs to transmit and receive data repeatedly, i.e., a data packet needs to be transmitted or received at a plurality of consecutive subframes. In order to reduce the data retransmission times, the UE needs to perform frequency hopping operation, so as to acquire a certain frequency diversity gain. Considering a frequency adjustment time, a certain retuning time needs to be reserved in the case that the UE is switched from one frequency to another, and during this period, the UE is incapable of transmitting or receiving data.

In the prior art, it assumes that the retuning time of the UE is 1 ms in accordance with a structure of the TD-LTE system. Taking the uplink-downlink timeslot configuration #1 of the TD-LTE system as an example, frequency hopping patterns for uplink and downlink transmission may be designed separately, as shown in FIG. 3, and during each frequency hopping operation, merely the uplink data or the downlink data is transmitted, i.e. frequency hopping patterns for the uplink transmission and the downlink transmission are designed separately, resulting in a waste of physical resources, an extended period for transmitting and receiving the data by the UE, and an increase in the power consumption of the UE.

Therefore, due to the separately designed frequency hopping patterns for the transmission of the uplink and the downlink data in the prior art, in the case that the transmission of the uplink data is switched to the reception of the downlink data or the reception of the downlink data is switched to the transmission of the uplink data, the frequency hopping operation needs to be performed. As a result, it is necessary to perform many frequency hopping operations, prolongs the total retuning time, wastes a large amount of physical transmission resources, increases the time for the data transmission of the UE, and increases the power consumption of the UE.

SUMMARY

An object of the present disclosure is to provide a data transmission method and a data transmission device for a TDD system, so as to reduce the frequency hopping operations of the UE, reduce the retuning time, prolong a valid duration for the data transmission and reduce the time for the data transmission, and reduce the power consumption.

In one aspect, the present disclosure provides in some embodiments a data transmission method for a TDD system, including steps of: at a predetermined retuning start time point, adjusting, by a UE, a carrier frequency for data reception and transmission within a predetermined retuning duration so as to acquire the adjusted carrier frequency; and performing, by the UE, uplink data transmission and downlink data reception at the adjusted carrier frequency with a network device within a consecutive duration in accordance with a TDD uplink-downlink configuration, the consecutive duration being a duration from a current retuning end time point to a next retuning start time point.

According to the embodiments of the present disclosure, at the predetermined retuning start time point, the UE may adjust the carrier frequency for the data reception and transmission within the predetermined retuning duration so as to acquire the adjusted carrier frequency, and then perform the uplink data transmission and the downlink data reception at the adjusted carrier frequency, i.e., after each adjustment of the carrier frequency, with the network device within the consecutive duration in accordance with the TDD uplink-downlink configuration. As compared with the prior art where frequency hopping patterns for uplink data and downlink data are designed separately and a frequency hopping operation needs to be performed every time the uplink data transmission is switched to downlink data reception or the downlink data reception is switched to the uplink data transmission, it is unnecessary for the data transmission method in the embodiments of the present disclosure to perform the frequency hopping operation every time that the uplink data transmission is switched to the downlink data reception or the downlink data reception is switched to the uplink data transmission. Within the consecutive duration after each adjustment of the carrier frequency, the UE may perform the uplink data transmission and the downlink data reception with the network device in accordance with the TDD uplink-downlink configuration. As a result, it is able to reduce the frequency hopping operations, reduce the retuning time, prolong a valid duration for the data transmission and reduce the time for the data transmission, and reduce the power consumption.

In a possible embodiment of the above method of the present disclosure, the consecutive duration includes a plurality of consecutive subframes.

In a possible embodiment of the above method of the present disclosure, the retuning duration is greater than or equal to a time period for the adjustment of the carrier frequency by the UE.

In a possible embodiment of the above method of the present disclosure, the retuning duration is a duration in subframes, timeslots or symbols.

In a possible embodiment of the above method of the present disclosure, with respect to each time of retuning, the retuning start time point is located within an uplink subframe and the retuning end time point is a switching time point between the uplink subframe and a downlink subframe, or the retuning start time point is a switching time point between an uplink subframe and a downlink subframe and the retuning end time point is located within the downlink subframe.

In a possible embodiment of the above method of the present disclosure, in the case that the time period for the adjustment of the carrier frequency by the UE is smaller than or equal to a sum of a duration of a DwPTS and a duration of an UpPTS in a special subframe, the retuning start time point is a start time point of the special subframe, and the retuning end time point is an end time point of the special subframe.

In a possible embodiment of the above method of the present disclosure, in the case that the time period for the adjustment of the carrier frequency by the UE is smaller than or equal to a duration of a GP timeslot of the special subframe, and the retuning duration is located within the GP timeslot of the special subframe.

In a possible embodiment of the above method of the present disclosure, prior to adjust, by the UE, the carrier frequency for the data reception and transmission, the data transmission method further includes: acquiring, by the UE, a special subframe configuration determined by the network device, a duration of a guard period in the special subframe configuration being greater than or equal to twice a sum of a signal transmission time delay from the network device to the UE and the duration for the adjustment of the carrier frequency by the UE, or greater than or equal to twice a sum of a timing advance of the UE and the duration for the adjustment of the carrier frequency by the UE.

In a possible embodiment of the above method of the present disclosure, the step of acquiring, by the UE, the special subframe configuration determined by the network device includes: acquiring, by the UE, the special subframe configuration from a system broadcast message or user-specific signaling transmitted by the network device, the user-specific signaling including high layer signaling and physical layer signaling.

In a possible embodiment of the above method of the present disclosure, with respect to each time of retuning, the retuning start time point and the retuning duration are pre-configured in the UE, or notified by the network device to the UE.

In another aspect, the present disclosure provides in some embodiments a data transmission device for a TDD system, including: a processing unit configured to, at a predetermined retuning start time point, adjust a carrier frequency for data reception and transmission within a predetermined retuning duration so as to acquire the adjusted carrier frequency; and an interaction unit connected to the processing unit and configured to perform uplink data transmission and downlink data reception at the adjusted carrier frequency with a network device within a consecutive duration in accordance with a TDD uplink-downlink configuration, the consecutive duration being a duration from a current retuning end time point to a next retuning start time point.

According to the embodiments of the present disclosure, at the predetermined retuning start time point, the UE where the data transmission device resides may adjust the carrier frequency for the data reception and transmission within the predetermined retuning duration so as to acquire the adjusted carrier frequency, and then perform the uplink data transmission and the downlink data reception at the adjusted carrier frequency, i.e., after each adjustment of the carrier frequency, with the network device within the consecutive duration in accordance with the TDD uplink-downlink configuration. As compared with the prior art where frequency hopping patterns for uplink data and downlink data are designed separately and a frequency hopping operation needs to be performed every time that the uplink data transmission is switched to downlink data reception or the downlink data reception is switched to the uplink data transmission, it is unnecessary for the UE where the data transmission device resides in the embodiments of the present disclosure to perform the frequency hopping operation every time that the uplink data transmission is switched to the downlink data reception or the downlink data reception is switched to the uplink data transmission. Within the consecutive duration after each adjustment of the carrier frequency, the UE where the data transmission device resides may perform the uplink data transmission and the downlink data reception with the network device in accordance with the TDD uplink-downlink configuration. As a result, it is able to reduce the frequency hopping operations, reduce the retuning time, prolong a valid duration for the data transmission and reduce the time for the data transmission, and reduce the power consumption.

In a possible embodiment of the above data transmission device of the present disclosure, the consecutive duration includes a plurality of consecutive subframes.

In a possible embodiment of the above data transmission device of the present disclosure, the retuning duration is greater than or equal to a time period for the adjustment of the carrier frequency by the processing unit.

In a possible embodiment of the above data transmission device of the present disclosure, the retuning duration is a duration in subframes, timeslots or symbols.

In a possible embodiment of the above data transmission device of the present disclosure, with respect to each time of retuning, the retuning start time point is located within an uplink subframe and the retuning end time point is a switching time point between the uplink subframe and a downlink subframe, or the retuning start time point is a switching time point between an uplink subframe and a downlink subframe and the retuning end time point is located within the downlink subframe.

In a possible embodiment of the above data transmission device of the present disclosure, in the case that the time period for the adjustment of the carrier frequency by the processing unit is smaller than or equal to a sum of a duration of a DwPTS and a duration of an UpPTS in a special subframe, the retuning start time point is a start time point of the special subframe, and the retuning end time point is an end time point of the special subframe.

In a possible embodiment of the above data transmission device of the present disclosure, in the case that the time period for the adjustment of the carrier frequency by the processing unit is smaller than or equal to a duration of a GP timeslot of the special subframe, and the retuning duration is located within the GP timeslot of the special subframe.

In a possible embodiment of the above data transmission device of the present disclosure, prior to adjust the carrier frequency for the data reception and transmission by the processing unit, the interaction unit is further configured to acquire a special subframe configuration determined by the network device, a duration of a guard period in the special subframe configuration being greater than or equal to twice a sum of a signal transmission time delay from the network device to the UE where the data transmission device resides and the duration for the adjustment of the carrier frequency by the processing unit, or greater than or equal to twice a sum of a timing advance of the UE where the data transmission device resides and the duration for the adjustment of the carrier frequency by the processing unit.

In a possible embodiment of the above data transmission device of the present disclosure, the interaction unit is further configured to acquire the special subframe configuration from a system broadcast message or user-specific signaling transmitted by the network device, the user-specific signaling including high layer signaling and physical layer signaling.

In a possible embodiment of the above data transmission device of the present disclosure, with respect to each time of retuning, the retuning start time point and the retuning duration are pre-configured in the processing unit, or notified by the network device to the UE where the data transmission device resides.

DETAILED DESCRIPTION OF THE EMBODIMENTS

A data transmission method and a data transmission device for a TDD system of the present disclosure will be described hereinafter in conjunction with the drawings and embodiments.

Figure 1:
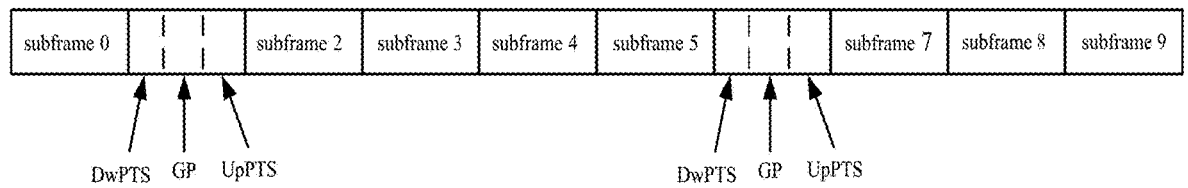
FIG. 1 is a schematic view showing a radio frame in a TDD wireless communication system in prior art.
Figure 2:
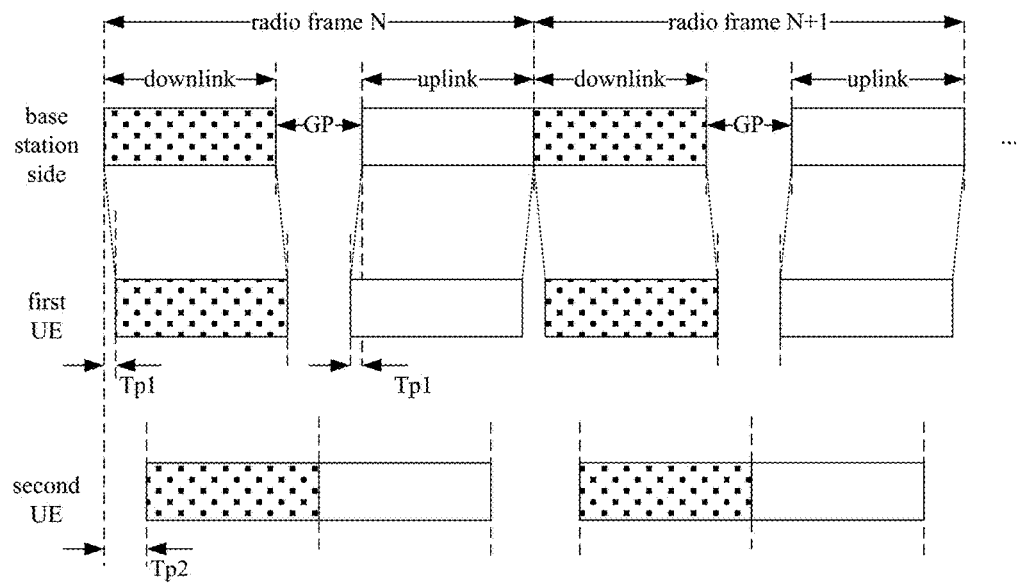
FIG. 2 is a schematic view showing a GP of a special subframe in a radio frame in prior art.
Figure 3:
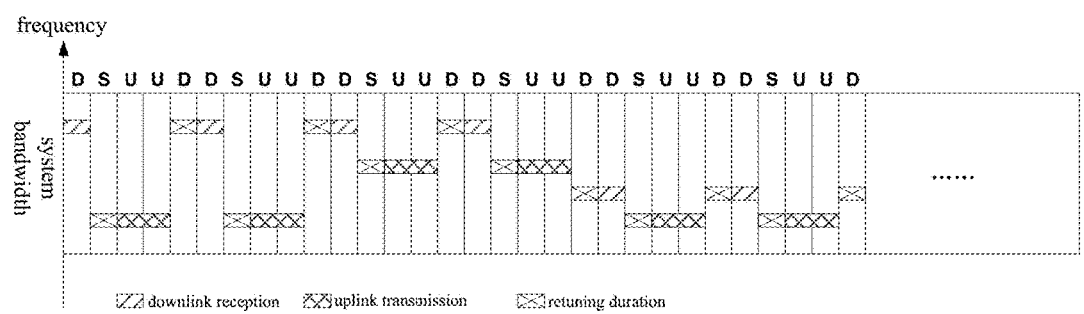
FIG. 3 is a schematic view showing frequency hopping patterns separately designed for the transmission of uplink and downlink data in prior art.
Figure 4:
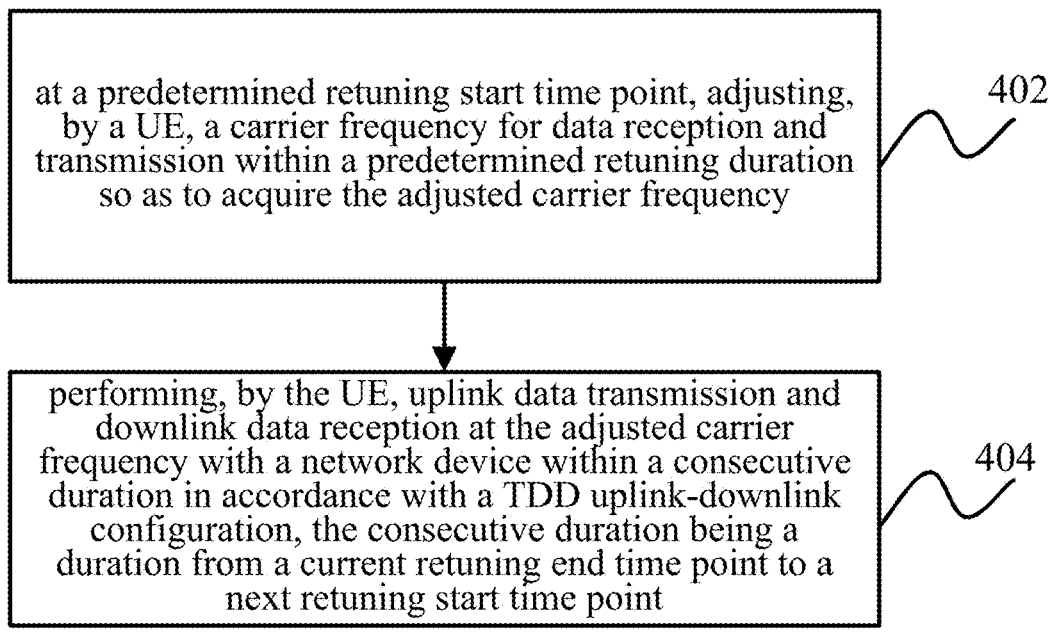
FIG. 4 is a flow chart of a data transmission method for a TDD system according to one embodiment of the present disclosure.

The present disclosure provides in some embodiments a data transmission method for a TDD system which, as shown in FIG. 4, includes: Step 402 of, at a predetermined retuning start time point, adjusting, by a UE, a carrier frequency for data reception and transmission within a predetermined retuning duration so as to acquire the adjusted carrier frequency; and Step 404 of performing, by the UE, uplink data transmission and downlink data reception at the adjusted carrier frequency with a network device within a consecutive duration in accordance with a TDD uplink-downlink configuration, the consecutive duration being a duration from a current retuning end time point to a next retuning start time point.

According to the embodiments of the present disclosure, at the predetermined retuning start time point, the UE may adjust the carrier frequency for the data reception and transmission within the predetermined retuning duration so as to acquire the adjusted carrier frequency, and then perform the uplink data transmission and the downlink data reception at the adjusted carrier frequency, i.e., after each adjustment of the carrier frequency, with the network device within the consecutive duration in accordance with the TDD uplink-downlink configuration. As compared with the prior art where frequency hopping patterns for uplink data and downlink data are designed separately and a frequency hopping operation needs to be performed every time that the uplink data transmission is switched to downlink data reception or the downlink data reception is switched to the uplink data transmission, it is unnecessary for the data transmission method in the embodiments of the present disclosure to perform the frequency hopping operation every time that the uplink data transmission is switched to the downlink data reception or the downlink data reception is switched to the uplink data transmission. Within the consecutive duration after each adjustment of the carrier frequency, the UE may perform the uplink data transmission and the downlink data reception with the network device in accordance with the TDD uplink-downlink configuration. As a result, it is able to reduce the frequency hopping operations, reduce the retuning time, prolong a valid duration for the data transmission and reduce the time for the data transmission, and reduce the power consumption.

Certainly, it should be appreciated that, within the consecutive duration after the adjustment of the carrier frequency, a radio frame for the uplink data transmission and the downlink data reception may include a special subframe.

In a possible embodiment of the method of the present disclosure, the consecutive duration includes a plurality of consecutive subframes.

During the implementation, the consecutive duration may include a plurality of consecutive subframes for the uplink data transmission and the downlink data reception. The number of the consecutive subframes may be predefined by the UE or notified by the network device to the UE.

In a possible embodiment of the method of the present disclosure, the retuning duration is greater than or equal to a time period for the adjustment of the carrier frequency by the UE.

It should be appreciated that, on the premise of ensuring that the retuning duration is greater than or equal to the time period for the adjustment of the carrier frequency by the UE, the retuning time should be reduced and the valid duration for the data transmission should be prolonged as possible, so as to reduce the actual time period for the data transmission and reduce the power consumption.

In a possible embodiment of the method of the present disclosure, the retuning duration is a duration in subframes, timeslots or symbols.

During the implementation, the unit of the retuning duration may be selected flexibly in accordance with the time period for the adjustment of the carrier frequency by the UE. The retuning duration will be described hereinafter on the basis of subframes, timeslots and symbols.

Example 1

The retuning duration in subframes may be reserved for the UE. The UE may adjust the carrier frequency in N1 consecutive subframes. Between two consecutive time periods for the adjustment of the carrier frequency, i.e., between the current retuning end time point and a next retuning start time point, the UE may perform the uplink data transmission and the downlink data transmission at an identical frequency in accordance with the TDD uplink-downlink configuration. In order to reduce the waste of resources, the power consumption of the UE and the time period for the data transmission and reception due to the adjustment of the carrier frequency as possible, a value of N1 may be as small as possible on the premise that N1 is greater than or equal to the time period for the adjustment of the carrier frequency by the UE.

Figure 5:
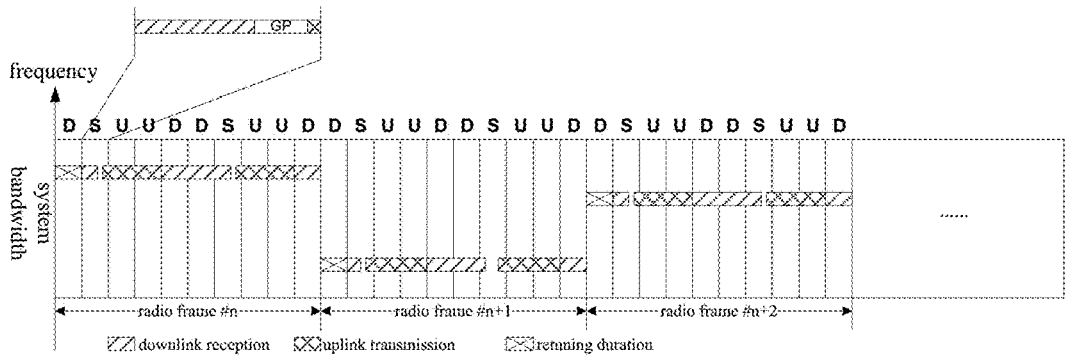
FIG. 5 is a schematic view showing a frequency hopping pattern in subframes according to one embodiment of the present disclosure.

During the implementation, the time period for the adjustment of the carrier frequency by the UE may be smaller than or equal to 1 ms, and a normal subframe may be reserved for the UE as the retuning duration. Taking the TD-LTE uplink-downlink timeslot configuration #1 as an example, FIG. 5 shows a frequency hopping pattern, where a first downlink subframe of the radio frame may be reserved for the UE as the retuning duration, and the UE may operate at an identical carrier frequency in one radio frame and perform data transmission and reception with the network device in accordance with the TDD uplink-downlink configuration.

Example 2

The retuning duration in timeslots may be reserved for the UE. The UE may adjust the carrier frequency in N2 consecutive timeslots. Between two consecutive time periods for the adjustment of the carrier frequency, the UE may perform the data transmission and reception at an identical carrier frequency in accordance with the TDD uplink-downlink configuration. In order to reduce the waste of resources, the power consumption of the UE and the time period for the data transmission and reception due to the adjustment of the carrier frequency as possible, a value of N2 may be as small as possible on the premise that N2 is greater than or equal to the time period for the adjustment of the carrier frequency by the UE.

Figure 6:
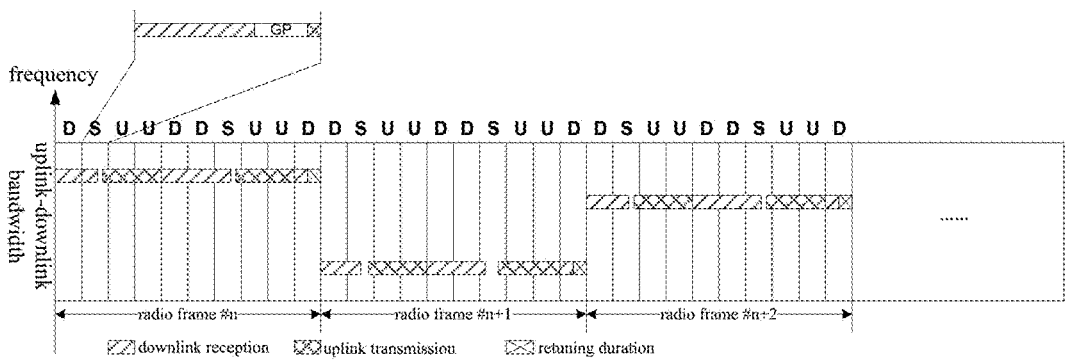
FIG. 6 is a schematic view showing a frequency hopping pattern in timeslots according to one embodiment of the present disclosure.

In implementation, the time period for the adjustment of the carrier frequency by the UE is 0.4 ms, so the retuning duration of 0.5 ms, i.e., one timeslot, may be reserved for the UE. The retuning duration of one timeslot may be reserved within a first-half timeslot or a second-half timeslot of one subframe. Taking the TD-LTE uplink-downlink timeslot configuration #1 as an example, FIG. 6 shows a frequency hopping pattern, where a second-half timeslot of the last downlink subframe in a radio frame may serve as the retuning duration of the UE, and the UE may operate at the adjusted carrier frequency in a next radio frame and perform data transmission and reception in accordance with the TDD uplink-downlink configuration. The UE may adjust the carrier frequency in accordance with the frequency hopping pattern, and during the adjustment of the carrier frequency, it is impossible for the UE to receive or transmit data.

Figure 7:
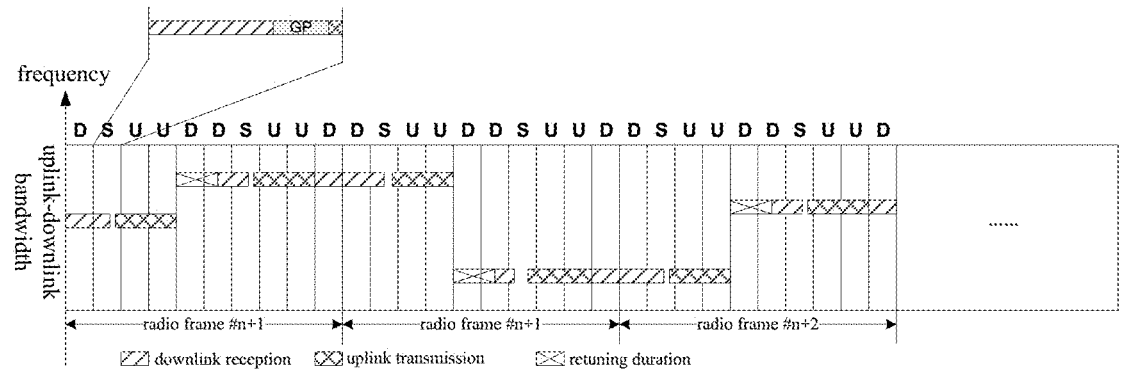
FIG. 7 is another schematic view showing the frequency hopping pattern in timeslots according to one embodiments of the present disclosure.

In another possible embodiment of the present disclosure, the retuning duration for the UE is 1.4 ms, so the retuning duration of 1.5 ms, i.e., three timeslots, may be reserved for the UE. Taking the TD-LTE uplink-downlink timeslot configuration #1 as an example, FIG. 7 shows a frequency hopping pattern, where three timeslots in one radio frame may serve as the retuning duration, and the UE may adjust the carrier frequency in accordance with the frequency hopping pattern. During the adjustment of the carrier frequency, it is impossible for the UE to receive or transmit data. After the adjustment of the carrier frequency, the UE may perform the data reception and transmission at the adjusted carrier frequency in accordance with the TDD uplink-downlink configuration, until a next retuning start time point comes.

Example 3

The retuning duration in symbols may be served for the UE. The UE may adjust the carrier frequency within N3 symbols, and between two consecutive time periods for the adjustment of the carrier frequency, the UE may perform the data transmission and reception at an identical carrier frequency in accordance with the TDD uplink-downlink configuration.

In order to reduce the waste of resources, the power consumption of the UE and the time period for the data transmission and reception due to the adjustment of the carrier frequency as possible, a value of N3 may be as small as possible on the premise that N3 is greater than or equal to the time period for the adjustment of the carrier frequency by the UE.

In each uplink subframe, each Single-Carrier Frequency-Division Multiple Access (SC-FDMA) symbol has a duration of $$\frac{1}{2 * N_{symb}^{UL}}$$

ms. For a normal CP, $N_{symb}^{UL}$ is 7, and for an extended CP, $N_{symb}^{UL}$ is 6.

In each downlink subframe, each Orthogonal Frequency Division Multiplex (OFDM) symbol has a duration of $$\frac{1}{2 * N_{symb}^{DL}}$$

ms. For a normal CP, $N_{symb}^{DL}$ is 7, and for an extended CP, in the case that a frequency interval is 15 kHz, $N_{symb}^{DL}$ is 6, and in the case that the frequency interval is 7.5 kHz, $N_{symb}^{DL}$ is 3.

Figure 8:
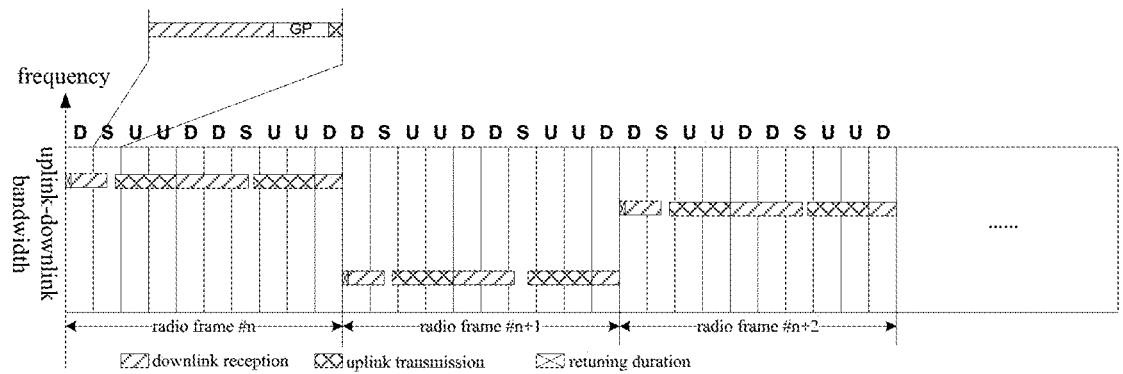
FIG. 8 is a schematic view showing a frequency hopping pattern in symbols according to one embodiment of the present disclosure.

In a possible embodiment of the present disclosure, the retuning duration for the UE is 0.2 ms, so the retuning duration of three symbols may be reserved for the UE, with the normal CP as an example. The retuning duration of three symbols may include any three consecutive symbols in one subframe, preferably the first three symbols in one downlink subframe, because a UE with small-bandwidth cannot receive a conventional control area which occupies the first several symbols in the subframe. Taking the TD-LTE uplink-downlink timeslot configuration #1 as an example, FIG. 8 shows a frequency hopping pattern, where the first three OFDM symbols in a first downlink subframe of a radio frame may be used as the time period for the adjustment of the carrier frequency.

Figure 9:
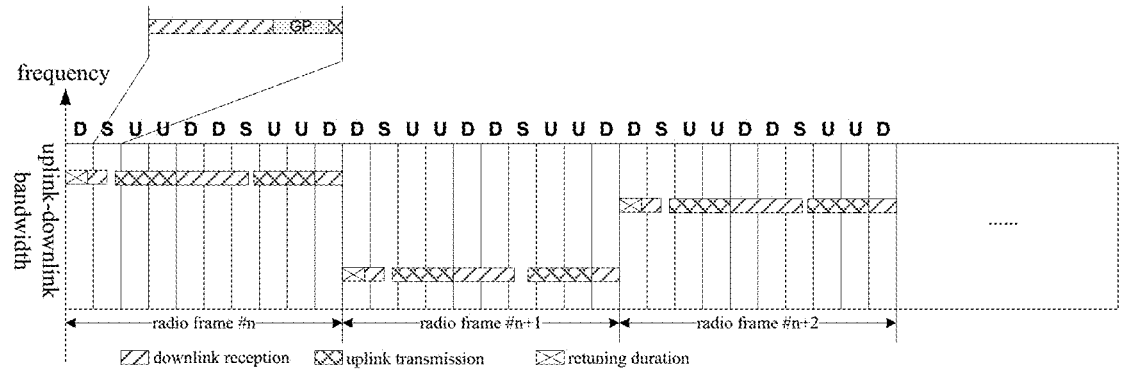
FIG. 9 is another schematic view showing the frequency hopping pattern in symbols according to one embodiment of the present disclosure.

In another possible embodiment of the present disclosure, the retuning duration for the UE is 0.7 ms, so the retuning duration of 10 symbols may be reserved for the UE, with the normal CP as an example. The retuning duration of 10 symbols may include any 10 consecutive symbols in one subframe. Taking the TD-LTE uplink-downlink timeslot configuration #1 as an example, FIG. 9 shows a frequency hopping pattern, where the first 10 OFDM symbols in a first downlink subframe of a radio frame may be used as the time period for the adjustment of the carrier frequency.

In a possible embodiment of the present disclosure, with respect to each time of retuning, the retuning start time point is located within an uplink subframe and the retuning end time point is a switching time point between the uplink subframe and a downlink subframe, or the retuning start time point is a switching time point between an uplink subframe and a downlink subframe and the retuning end time point is located within the downlink subframe.

During the implementation, an uplink signal may be transmitted in advance and a downlink signal may be transmitted in a delayed manner, such that every time the retuning start time point is located within an uplink subframe and the retuning end time point is a switching time point between the uplink subframe and a downlink subframe, or every time the retuning start time point is a switching time point between an uplink subframe and a downlink subframe and the retuning end time point is located within the downlink subframe, it is able for the UE to acquire a longer time period for the adjustment of the carrier frequency.

Figure 10:
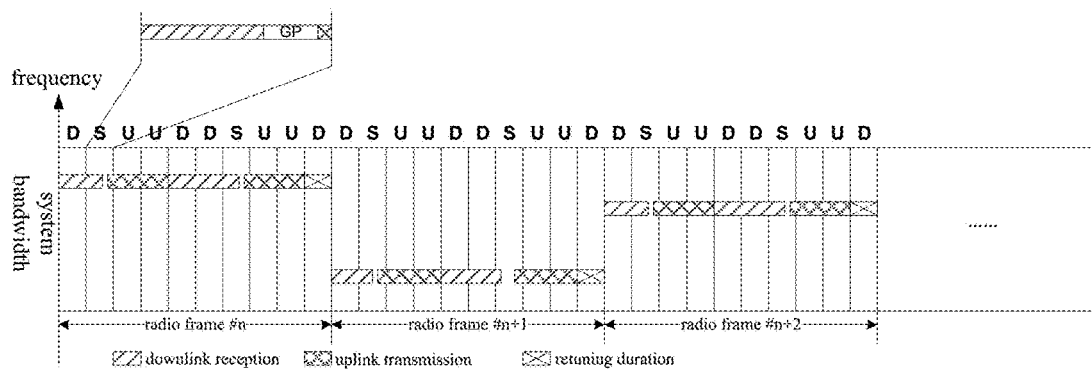
FIG. 10 is a schematic view showing a frequency hopping pattern in subframes for adjusting a carrier frequency in the case that an uplink subframe is switched to a downlink subframe according to one embodiment of the present disclosure.

During the implementation, taking the retuning duration in subframes as an example, the retuning duration for the UE is smaller than or equal to 1 ms, so one normal subframe may be served for the UE as the time period for the adjustment of the carrier frequency. Taking the TD-LTE uplink-downlink timeslot configuration #1 as an example, FIG. 10 shows a frequency hopping pattern, where a first downlink subframe may be used as the retuning duration of the UE in the case that the uplink subframe is to be switched to the downlink subframe. Certainly, in some other embodiments of the present disclosure, the last uplink subframe may also be used as the retuning duration of the UE in the case that the uplink subframe is to be switched to the downlink subframe.

In a possible embodiment of the present disclosure, in the case that the time period for the adjustment of the carrier frequency by the UE is smaller than or equal to a sum of a duration of a DwPTS and a duration of an UpPTS in a special subframe, the retuning start time point is a start time point of the special subframe, and the retuning end time point is an end time point of the special subframe.

Figure 11:
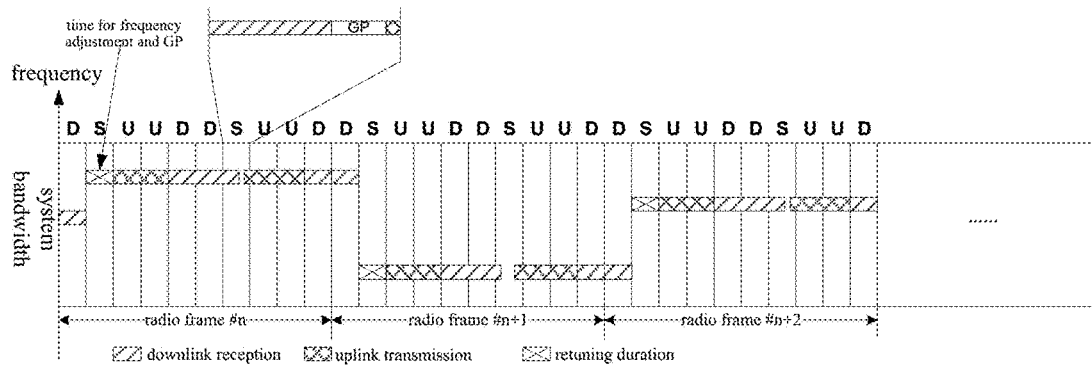
FIG. 11 is a schematic view showing a frequency hopping pattern in subframes for adjusting the carrier frequency in a special subframe according to one embodiment of the present disclosure.

During the implementation, in the case that the time period for the adjustment of the carrier frequency by the UE is smaller than or equal to a sum of a duration of a DwPTS and a duration of an UpPTS in a special subframe, one special subframe may be reserved for the UE as the retuning duration. Taking the TD-LTE uplink-downlink timeslot configuration #1 as an example, FIG. 11 shows a frequency hopping pattern, where one special subframe may be reserved for the UE as the retuning duration, and the UE may adjust the carrier frequency in the one special subframe in accordance with the frequency hopping pattern. During the adjustment of the carrier frequency, it is impossible for the UE to perform the data reception or transmission. After the adjustment of the carrier frequency, the UE may perform the data reception and transmission at the adjusted carrier frequency in accordance with the TDD uplink-downlink configuration, until a next special subframe for the adjustment of the carrier frequency comes.

During the implementation, in the case that the time period for the adjustment of the carrier frequency by the UE is smaller than or equal to a duration of a GP timeslot of the special subframe, and the retuning duration is located within the GP timeslot of the special subframe.

In a possible embodiment of the present disclosure, prior to adjust, by the UE, the carrier frequency for the data reception and transmission, the data transmission method further includes acquiring, by the UE, a special subframe configuration determined by the network device, a duration of a guard period in the special subframe configuration being greater than or equal to twice a sum of a signal transmission time delay from the network device to the UE and the duration for the adjustment of the carrier frequency by the UE, or greater than or equal to twice a sum of a timing advance of the UE and the duration for the adjustment of the carrier frequency by the UE.

During the implementation, in the case that the retuning duration of the UE is smaller than or equal to the duration of the GP timeslot, the UE may be configured to perform the frequency hopping operation within the GP timeslot of the special subframe, and the duration of the GP timeslot of the special subframe may be greater than or equal to twice a sum of the signal transmission time delay from the network device to the UE (or twice the timing advance) and the time period for the adjustment of the carrier frequency by the UE. It should be appreciated that, the larger the GP timeslot, the larger a proportion of an unavailable portion in the special subframe, and the lower the transmission efficiency. Hence, this special configuration may merely be used in the case that the UE needs to perform the frequency hopping operation within the GP timeslot of the special subframe.

During the implementation, taking a normal CP as an example, it assumes that the time period for the adjustment of the carrier frequency by the UE includes 6 symbols, and according to a cell radius, a GP timeslot for a peripheral UE needs to have a duration of 4 symbols so as to prevent the downlink signal from interfering with the uplink signal. Table 5 shows the special subframe configurations in the prior art. At this time, the network device may configure a special subframe configuration #1 (where the GP timeslot includes 4 symbols) for the UE which does not need to perform the frequency hopping operation within the GP timeslot, and configure a special subframe configuration #0 (where the GP timeslot includes 10 symbols) for the UE which needs to perform the frequency hopping operation within the GP timeslot.

TABLE 5

| Special subframe | Normal CP | | |
| --- | --- | --- | --- |
| configuration | DwPTS | GP | UpPTS |
| 0 | 3 | 10 | 1 |
| 1 | 9 | 4 | 1 |

Figure 12:
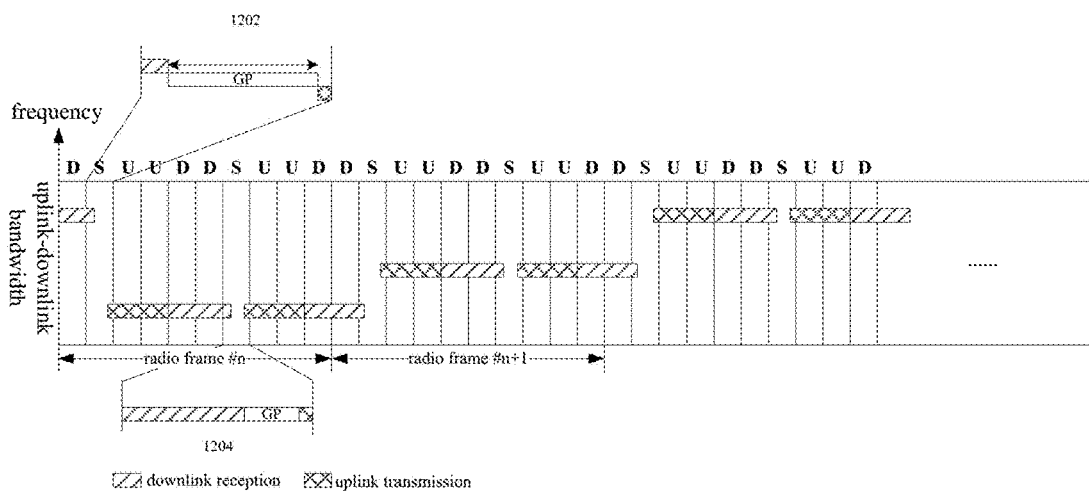
FIG. 12 is a schematic view showing a frequency hopping pattern in symbols for adjusting the carrier frequency in a GP according to one embodiment of the present disclosure.

In the case that the UE needs to perform the frequency hopping operation within the GP timeslot of the special subframe, it may determine the DwPTS, the GP and the UpPTS of the special subframe in accordance with the special subframe configuration #0; otherwise, it may determine the DwPTS, the GP and the UpPTS of the special subframe in accordance with the special subframe configuration #1. As shown in FIG. 12, taking a radio frame # n as an example, a special subframe 1202 of the radio frame is configured with the special subframe configuration #0, the GP timeslot has a duration of 10 symbols, and the UE adjusts the carrier frequency within the duration of the GP timeslot. A special subframe 1204 is still configured with the special subframe configuration #1. The GP timeslot has a duration of 4 symbols, and the UE does not need to adjust the carrier frequency within the duration of the GP timeslot. Correspondingly, in the special subframe 1202 where the carrier frequency needs to be adjusted by the UE, the network device (e.g., a base station) merely use 3 symbols for scheduling the DwPTS for the UE which needs to perform the frequency hopping operation, while in the other special subframe, the DwPTS may use 9 symbols for scheduling the DwPTS.

In another possible embodiment of the present disclosure, still taking the normal CP as an example, it assumes that the time period for the adjustment of the carrier frequency by the UE includes 3 symbols, and the number of the symbols of the GP timeslot for the UE may be determined in accordance with a position of the UE so as to prevent the downlink signal from interfering with the uplink signal. For example, the GP timeslot for a first UE needs to have a duration of 1 symbol so as to prevent the downlink signal from interfering with the uplink signal, and the GP timeslot for a second UE, which is located at a cell edge, needs to have a duration of 4 symbols so as to prevent the downlink signal from interfering with the uplink signal, so the first UE may be configured with the special subframe configuration #1 and the second UE may be configured with the special subframe configuration #0. The first UE may always determine the DwPTS, the GP and the UpPTS in the special subframe in accordance with the special subframe configuration #1. In the case that the second UE needs to perform the frequency hopping operation within the GP timeslot of the special subframe, it may determine the DwPTS, the GP and the UpPTS in the special subframe in accordance with the special subframe configuration #0; otherwise, it may determine the DwPTS, the GP and the UpPTS in the special subframe in accordance with the special subframe configuration #1.

During the implementation, the step of acquiring, by the UE, the special subframe configuration determined by the network device includes acquiring, by the UE, the special subframe configuration from a system broadcast message or user-specific signaling transmitted by the network device. The user-specific signaling includes high layer signaling and physical layer signaling.

In a possible embodiment of the present disclosure, with respect to each time of retuning, the retuning start time point and the retuning duration are pre-configured in the UE, or notified by the network device to the UE.

Figure 13:
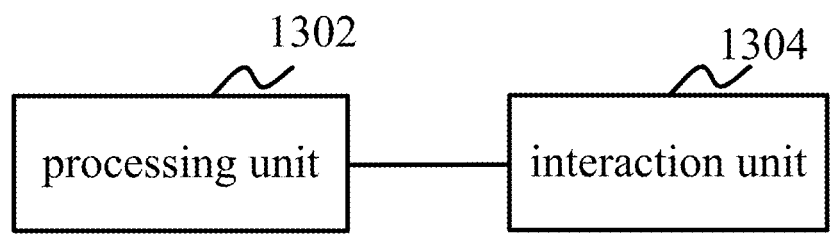
FIG. 13 is a schematic view showing a data transmission device for a TDD system according to one embodiment of the present disclosure.

The present disclosure further provides in some embodiments a data transmission device for a TDD system which, as shown in FIG. 13, includes: a processing unit 1302 configured to, at a predetermined retuning start time point, adjust a carrier frequency for data reception and transmission within a predetermined retuning duration so as to acquire the adjusted carrier frequency; and an interaction unit 1304 connected to the processing unit 1302 and configured to perform uplink data transmission and downlink data reception at the adjusted carrier frequency with a network device within a consecutive duration in accordance with a TDD uplink-downlink configuration, the consecutive duration being a duration from a current retuning end time point to a next retuning start time point.

According to the embodiments of the present disclosure, at the predetermined retuning start time point, the UE where the data transmission device resides may adjust the carrier frequency for the data reception and transmission within the predetermined retuning duration so as to acquire the adjusted carrier frequency, and then perform the uplink data transmission and the downlink data reception at the adjusted carrier frequency, i.e., after each adjustment of the carrier frequency, with the network device within the consecutive duration in accordance with the TDD uplink-downlink configuration. As compared with the prior art where frequency hopping patterns for uplink data and downlink data are designed separately and a frequency hopping operation needs to be performed every time that the uplink data transmission is switched to downlink data reception or the downlink data reception is switched to the uplink data transmission, it is unnecessary for the data transmission device in the embodiments of the present disclosure to perform the frequency hopping operation every time that the uplink data transmission is switched to the downlink data reception or the downlink data reception is switched to the uplink data transmission. Within the consecutive duration after each adjustment of the carrier frequency, the UE where the data transmission device resides may perform the uplink data transmission and the downlink data reception with the network device in accordance with the TDD uplink-downlink configuration. As a result, it is able to reduce the frequency hopping operations, reduce the retuning time, prolong a valid duration for the data transmission and reduce the time for the data transmission, and reduce the power consumption.

In a possible embodiment of the data transmission device of the present disclosure, the consecutive duration includes a plurality of consecutive subframes.

In a possible embodiment of the data transmission device of the present disclosure, the retuning duration is greater than or equal to a time period for the adjustment of the carrier frequency by the processing unit 1302.

In a possible embodiment of the data transmission device of the present disclosure, the retuning duration is a duration in subframes, timeslots or symbols.

In a possible embodiment of the data transmission device of the present disclosure, with respect to each time of retuning, the retuning start time point is located within an uplink subframe and the retuning end time point is a switching time point between the uplink subframe and a downlink subframe, or the retuning start time point is a switching time point between an uplink subframe and a downlink subframe and the retuning end time point is located within the downlink subframe.

In a possible embodiment of the data transmission device of the present disclosure, in the case that the time period for the adjustment of the carrier frequency by the processing unit 1302 is smaller than or equal to a sum of a duration of a DwPTS and a duration of an UpPTS in a special subframe, the retuning start time point is a start time point of the special subframe, and the retuning end time point is an end time point of the special subframe.

In a possible embodiment of the present disclosure, in the case that the time period for the adjustment of the carrier frequency by the processing unit 1302 is smaller than or equal to a duration of a GP timeslot of the special subframe, and the retuning duration is located within the GP timeslot of the special subframe.

In a possible embodiment of the present disclosure, prior to adjust the carrier frequency for the data reception and transmission by the processing unit 1302, the interaction unit 1304 is further configured to acquire a special subframe configuration determined by the network device, a duration of a guard period in the special subframe configuration being greater than or equal to twice a sum of a signal transmission time delay from the network device to the UE where the data transmission device resides and the duration for the adjustment of the carrier frequency by the processing unit, or greater than or equal to twice a sum of a timing advance of the UE where the data transmission device resides and the duration for the adjustment of the carrier frequency by the processing unit.

In a possible embodiment of the data transmission device of the present disclosure, the interaction unit 1304 is further configured to acquire the special subframe configuration from a system broadcast message or user-specific signaling transmitted by the network device. The user-specific signaling includes high layer signaling and physical layer signaling.

In a possible embodiment of the data transmission device of the present disclosure, the retuning start time point and the retuning duration are pre-configured in the processing unit 1302, or notified by the network device to the UE where the data transmission device resides.

The data transmission device for the TDD system in the embodiments of the present disclosure may be taken as a part of a UE and integrated into the UE. The processing unit 1302 may be a Central Processing Unit (CPU) or the like, and the interaction unit 1304 may be a transceiver or the like.

Figure 14:
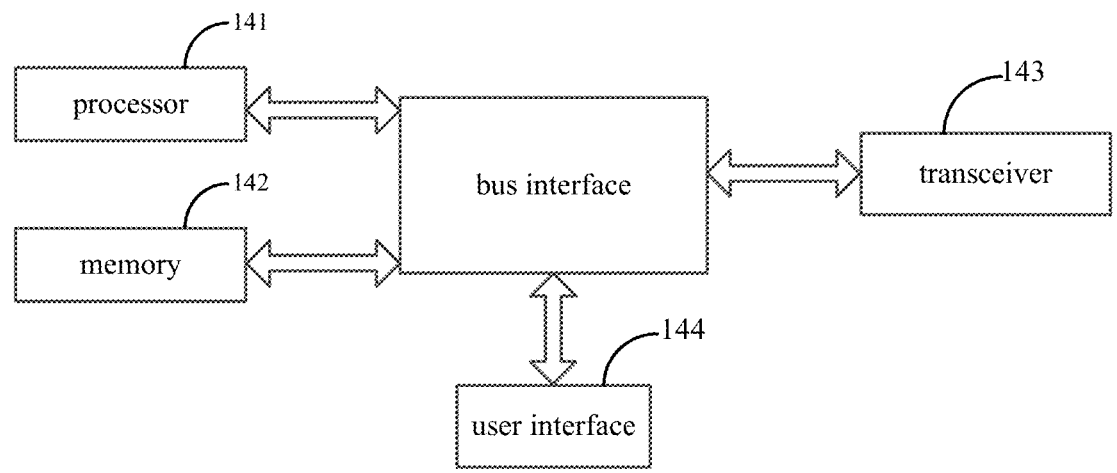
FIG. 14 is another schematic view showing the data transmission device for a TDD system according to one embodiment of the present disclosure.

The present disclosure further provides in some embodiments a data transmission device for a TDD system which, as shown in FIG. 14, includes a processor 141, a memory 142, a transceiver 143 and a user interface 144. The processor 141 is configured to read a program stored in the memory 142, so as to: at a predetermined retuning start time point, adjust a carrier frequency for data reception and transmission within a predetermined retuning duration so as to acquire the adjusted carrier frequency; and perform, through the transceiver 143, uplink data transmission and downlink data reception at the adjusted carrier frequency with a network device within a consecutive duration in accordance with a TDD uplink-downlink configuration, the consecutive duration being a duration from a current retuning end time point to a next retuning start time point. The transceiver 143 is configured to receive and transmit data under the control of the processor 141.

In FIG. 14, bus architecture may include a number of buses and bridges connected to each other, so as to connect various circuits for one or more processors such as the processor 141 and one or more memories such as the memory 142. In addition, as is known in the art, the bus architecture may be used to connect any other circuits, such as a circuit for a peripheral device, a circuit for a voltage stabilizer and a power management circuit, which are not further defined herein. Bus interfaces are provided, and the transceiver 143 may consist of a plurality of elements, i.e., a transmitter and a receiver for communication with any other devices over a transmission medium. With respect to different UEs, a user interface 144 may also be provided for devices which are to be arranged inside or outside the UE, and these devices may include but not limited to a keypad, a display, a speaker, a microphone and a joystick. The processor 141 may take charge of managing the bus architecture as well general processings. The memory 142 may store data desired for the operation of the processor 141.

In a word, according to data transmission method and the data transmission device for the TDD system in the embodiments of the present disclosure, at the predetermined retuning start time point, the UE may adjust the carrier frequency for the data reception and transmission within the predetermined retuning duration so as to acquire the adjusted carrier frequency, and then perform the uplink data transmission and the downlink data reception at the adjusted carrier frequency, i.e., after each adjustment of the carrier frequency, with the network device within the consecutive duration in accordance with the TDD uplink-downlink configuration. Hence, it is unnecessary in the embodiments of the present disclosure to perform the frequency hopping operation in the case that the uplink data transmission is switched to the downlink data reception or the downlink data reception is switched to the uplink data transmission. Within the consecutive duration after each adjustment of the carrier frequency, the UE may perform the uplink data transmission and the downlink data reception with the network device in accordance with the TDD uplink-downlink configuration. As a result, it is able to reduce the frequency hopping operations, reduce the retuning time, prolong a valid duration for the data transmission and reduce the time for the data transmission, and reduce the power consumption.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory and optical memory) including computer-readable program codes.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Obviously, a person skilled in the art may make further modifications and improvements without departing from the spirit of the present disclosure, and these modifications and improvements shall also fall within the scope of the present disclosure.

What is claimed is:

1. A data transmission method for a Time Division Duplex (TDD) system, comprising steps of:

adjusting, by a User Equipment (UE) at a predetermined retuning start time point, a carrier frequency for data reception and transmission within a predetermined retuning duration, to acquire the adjusted carrier frequency; and performing, by the UE, uplink data transmission and downlink data reception at the adjusted carrier frequency with a network device within a consecutive duration in accordance with a TDD uplink-downlink configuration, wherein the consecutive duration is a duration from a current retuning end time point to a next retuning start time point, wherein the retuning duration is a duration in subframes, timeslots or symbols, in the case that a time period for the adjustment of the carrier frequency by the UE is smaller than or equal to a sum of a duration of a Downlink Pilot Timeslot (DwPTS) and a duration of an Uplink Pilot Timeslot (UpPTS) in a special subframe, an entirety of the special subframe is configured to be the retuning duration, the retuning start time point is a start time point of the special subframe, and the retuning end time point is an end time point of the special subframe; and in the case that the time period for the adjustment of the carrier frequency by the UE is smaller than or equal to a duration of a Guard Period (GIP) timeslot of a special subframe, the retuning duration is located within the GIP timeslot of the special subframe.

2. The data transmission method according to claim 1, wherein with respect to each time of retuning, the retuning start time point is located within an uplink subframe, and the retuning end time point is a switching time point between the uplink subframe and a downlink subframe; or the retuning start time point is a switching time point between the uplink subframe and the downlink subframe, and the retuning end time point is located within the downlink subframe.

3. The data transmission method according to claim 1, wherein in the case that the time period for the adjustment of the carrier frequency by the UE is smaller than or equal to the duration of the GP timeslot of the special subframe, and the retuning duration is located within the GP timeslot of the special subframe, prior to adjust by the UE the carrier frequency for the data reception and transmission, the data transmission method further comprises:

acquiring, by the UE, a special subframe configuration determined by the network device, wherein a duration of a GP in the special subframe configuration is greater than or equal to twice a sum of a signal transmission time delay from the network device to the UE and the duration for the adjustment of the carrier frequency by the UE; or the duration of the GP in the special subframe configuration is greater than or equal to twice a sum of a timing advance of the UE and the duration for the adjustment of the carrier frequency by the UE.

4. The data transmission method according to claim 3, wherein the step of acquiring by the UE the special subframe configuration determined by the network device includes:

acquiring, by the UE, the special subframe configuration from a system broadcast message or user-specific signaling transmitted by the network device, wherein the user-specific signaling comprises high layer signaling and physical layer signaling.

5. The data transmission method according to claim 1, wherein with respect to each time of retuning, the retuning start time point and the retuning duration are pre-configured in the UE, or notified by the network device to the UE.

6. The data transmission method according to claim 1, wherein the consecutive duration comprises a plurality of consecutive subframes.

7. The data transmission method according to claim 1, wherein the retuning duration is greater than or equal to the time period for the adjustment of the carrier frequency by the UE.

8. A data transmission device for a Time Division Duplex (TDD) system, comprising: a processor, a memory and a transceiver, wherein the processor is configured to read a program stored in the memory to:

at a predetermined retuning start time point, adjust a carrier frequency for data reception and transmission within a predetermined retuning duration, to acquire the adjusted carrier frequency; and perform, through the transceiver, uplink data transmission and downlink data reception at the adjusted carrier frequency with a network device within a consecutive duration in accordance with a TDD uplink-downlink configuration, wherein the consecutive duration is a duration from a current retuning end time point to a next retuning start time point, the transceiver is configured to receive and transmit data, and the memory is configured to store therein data for the operation of the processor, wherein the retuning duration is a duration in subframes, timeslots or symbols, in the case that a time period for the adjustment of the carrier frequency by the processor is smaller than or equal to a sum of a duration of a Downlink Pilot Timeslot (DwPTS) and a duration of an Uplink Pilot Timeslot (UpPTS) in a special subframe, an entirety of the special subframe is configured to be the retuning duration, the retuning start time point is a start time point of the special subframe, and the retuning end time point is an end time point of the special subframe; and in the case that the time period for the adjustment of the carrier frequency by the processor is smaller than or equal to a duration of a Guard Period (GIP) timeslot of a special subframe, the retuning duration is located within the GIP timeslot of the special subframe.

9. The data transmission device according to claim 8, wherein with respect to each time of retuning, the retuning start time point is located within an uplink subframe, and the retuning end time point is a switching time point between the uplink subframe and a downlink subframe; or the retuning start time point is a switching time point between the uplink subframe and the downlink subframe, and the retuning end time point is located within the downlink subframe.

10. The data transmission device according to claim 8, wherein in the case that the time period for the adjustment of the carrier frequency by the processor is smaller than or equal to the duration of the GP timeslot of the special subframe, and the retuning duration is located within the GP timeslot of the special subframe, prior to adjust the carrier frequency for the data reception and transmission by the processor, the processor is further configured to:

acquire a special subframe configuration determined by the network device, wherein a duration of a GP in the special subframe configuration is greater than or equal to twice a sum of a signal transmission time delay from the network device to a User Equipment (UE) where the data transmission device resides and the duration for the adjustment of the carrier frequency by the processor; or the duration of the GP in the special subframe configuration is greater than or equal to twice a sum of a timing advance of the UE and the duration for the adjustment of the carrier frequency by the processor.

11. The data transmission device according to claim 10, wherein the processor is further configured to:

acquire the special subframe configuration from a system broadcast message or user-specific signaling transmitted by the network device, wherein the user-specific signaling comprises high layer signaling and physical layer signaling.

12. The data transmission device according to claim 8, wherein with respect to each time of retuning, the retuning start time point and the retuning duration are pre-configured in the processor, or notified by the network device to a UE where the data transmission device resides.

13. The data transmission device according to claim 8, wherein the retuning duration is greater than or equal to the time period for the adjustment of the carrier frequency by the processor.

14. The data transmission device according to claim 8, wherein the retuning duration is a duration in subframes, timeslots or symbols.

* * * * *